Jan. 8. 1957 R. C. WARREN 2,776,690
SKIN SEPARATOR
Filed June 21, 1955
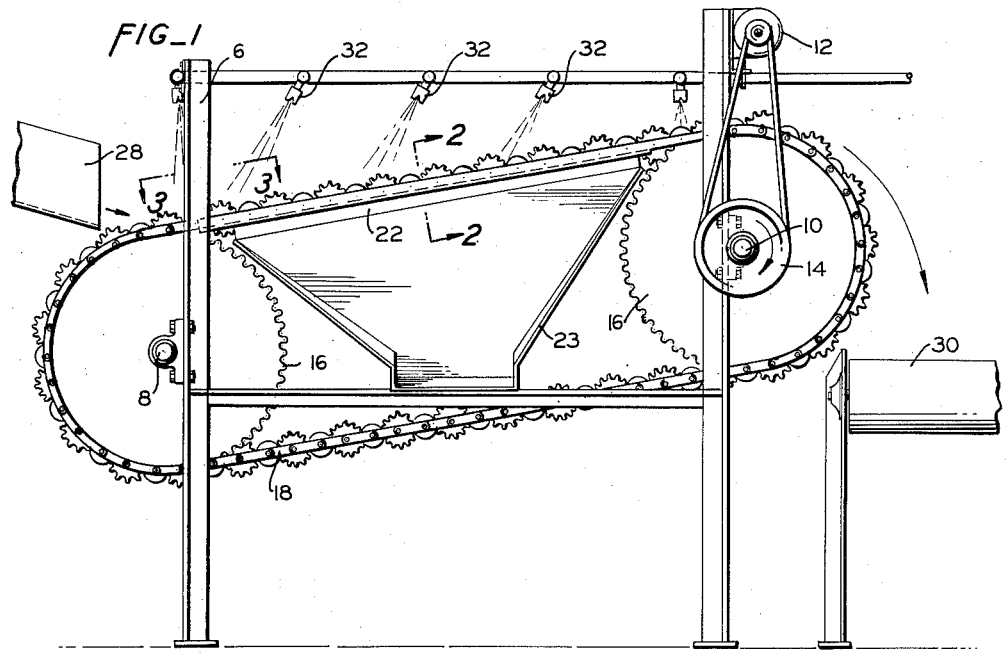
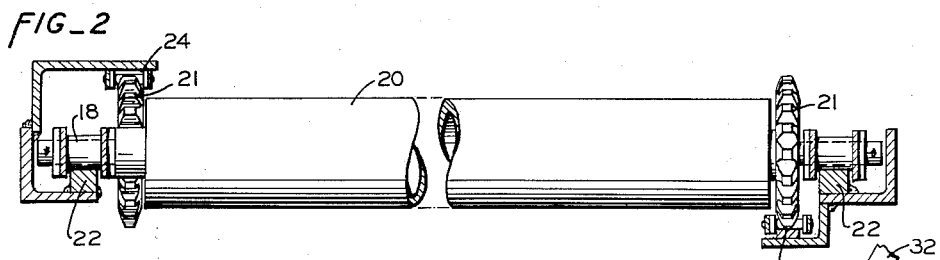
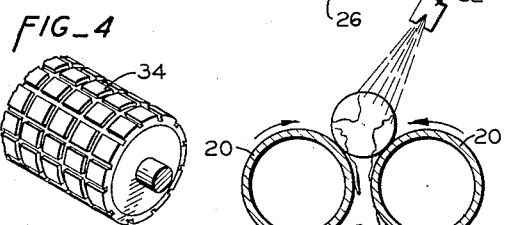
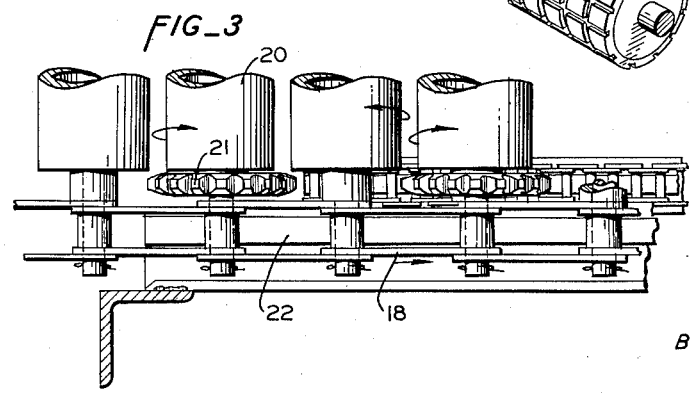
INVENTOR.
RAY C. WARREN
ECKHOFF & SLICK
ATTORNEYS
BY
A MEMBER OF THE FIRM United States Patent Office 2,776,690
Patented Jan. 8, 1957

2,776,690

SKIN SEPARATOR

Ray C. Warren, Woodland, Calif., assignor to Hershel California Fruit Products Co., Inc., a corporation of Illinois Application June 21, 1955, Serial No. 516,831

4 Claims. (Cl. 146—43)

This invention relates to a device for rubbing the skins off of fruit. The device of the present invention is particularly applicable to situations where fruit has been exposed to high pressure steam to loosen the skins and it is desired to rub the loose skins from the fruit.

It is the object of the present invention to provide a device of relatively simple construction which is capable of gently rubbing the skins from fruit without injuring the fruit.

In the drawings forming a part of this application:

Figure 1 is a side elevation of the device of the present invention.

Figure 2 is a section on the lines 2—2 of Figure 1.

Figure 3 is a partial plan view on the lines 3—3 of Figure 1.

Figure 4 is a partial perspective view of a roller showing an alternate form of construction.

Figure 5 is a diagrammatic view, showing the manner in which the rollers rub the skins off the fruit.

Referring now to the drawings by reference characters, there is shown a machine having a frame 6 at opposite ends of which are journaled for rotation two shafts designated 8 and 10. Shaft 10 is driven by means of the prime mover 12 and the pulley 14 by means of belt 13. As will be noted from the drawings, the shaft 10 is elevated somewhat from the shaft 8. Mounted on each of the shafts 8 and 10 are two sprockets 16. Two endless chains, 18, go around each pair of sprockets, one chain being located on each side of the machine. The chains 18 carry a series of rollers 20 mounted thereon, the rollers being affixed to the chains in such a manner that they may revolve. Each roller 20 has a cog wheel 21 at one end, alternate rollers having wheels at opposite ends. Mounted on each side of the machine are guides 22 which maintain the chain in a straight line as it passes over the bin 23. In addition, the guides carry racks 24 and 26 for the rotation of the cog wheels 21. Since one roller has a cog wheel at one end, while the adjacent roller has a cog wheel at the other end, and so on, and since one rack 24 is located over the path of the rollers and the second rack 26 is located under the path of the rollers, alternate rollers are rotated in opposite directions.

The device is equipped with a loading chute 28, and at the discharge end of the device, a conveyor 30 or other suitable means is provided to carry off the peeled product. Located over the path of the rollers are a series of water sprays 32.

In Figure 5, there is shown in diagrammatic manner the method by which the device works. As the rolls 20 rotate toward each other, they tend to have a scrubbing action on the fruit. Thus, the skin is rubbed off the fruit and this is assisted by the spray 32 located over the rollers. The spray also causes the dislodged skins to pass between the rollers and into the bin 23. The peeled fruit passes off the machine and into conveyor 30.

The nature of roller 22 is largely governed by the fruit which is being deskinned. Thus, if the fruit is easily deskinned, a smooth rubber roller, such as is shown in Figure 2, may be utilized. On the other hand, with fruits which are difficult to deskin and which require considerable friction, it is preferred to use a roller such as is shown in Figure 4, which has a series of serrations 34 thereon.

It is believed apparent from the above disclosure that I have described a device which is simple and effective for the deskinning of fruits.

I claim:

1. A device for deskinning fruit comprising a pair of parallel, upwardly inclined, endless chains, means for driving said pair of chains in the same direction in an upward direction, a series of rollers mounted between said chains, the spacing between adjacent rollers being less than the diameter of the fruit being skinned, a cog wheel mounted at the end of each roller, alternate cog wheels being mounted at opposite ends of the rollers, racks at opposite sides of the path of travel of the rollers, one of the racks being mounted over the path of travel of the rollers and the other rack being mounted below the path of travel of the rollers, whereby each of said racks engages alternate cog wheels and causes alternate rollers to rotate in opposite directions, and means for placing fruit to be skinned on said rollers near the lower end of said series of rollers, said fruit traveling upwardly on said rollers and being discharged by gravity at the high end of said series of rollers.

2. The device of claim 1 wherein a series of water sprays are located above the rollers.

3. The device of claim 1 wherein the rollers have a smooth surface.

4. The device of claim 1 wherein the rollers have a serrated surface.

References Cited in the file of this patent

UNITED STATES PATENTS

| | | |
|---|---|---|
| 1,296,131 | Stebler | Mar. 4, 1919 |
| 1,706,577 | Larsen | Mar. 26, 1929 |
| 2,477,006 | Pierson | July 26, 1949 |
| 2,527,364 | Koffler | Oct. 24, 1950 |